Sept. 25, 1934.         A. M. GRAFFIS                1,974,535
                         MOTOR VEHICLE
                    Filed Dec. 24, 1931        3 Sheets-Sheet 1
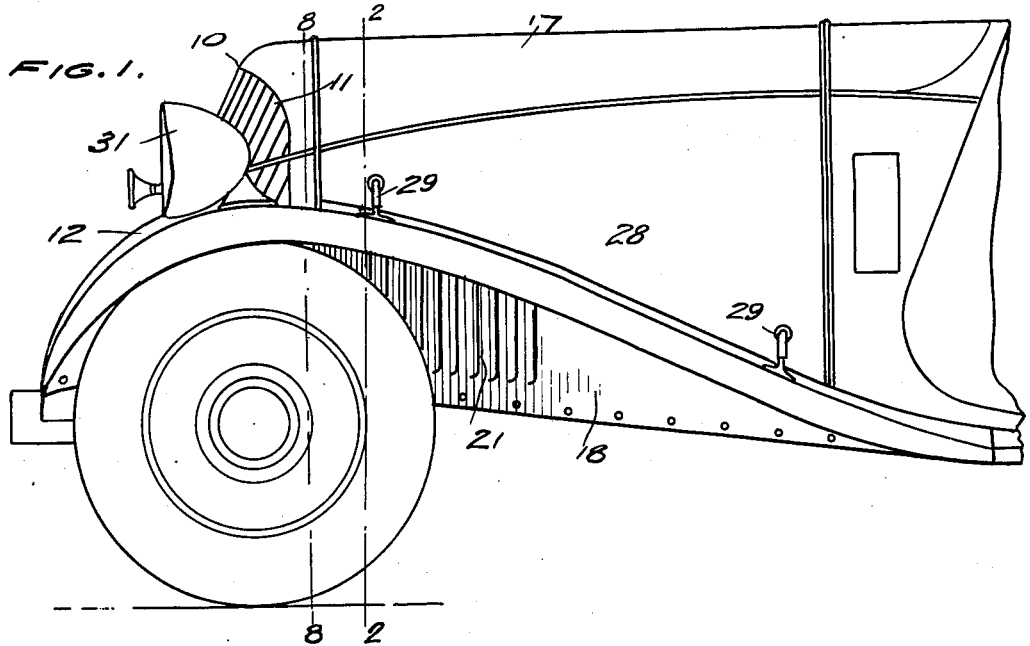
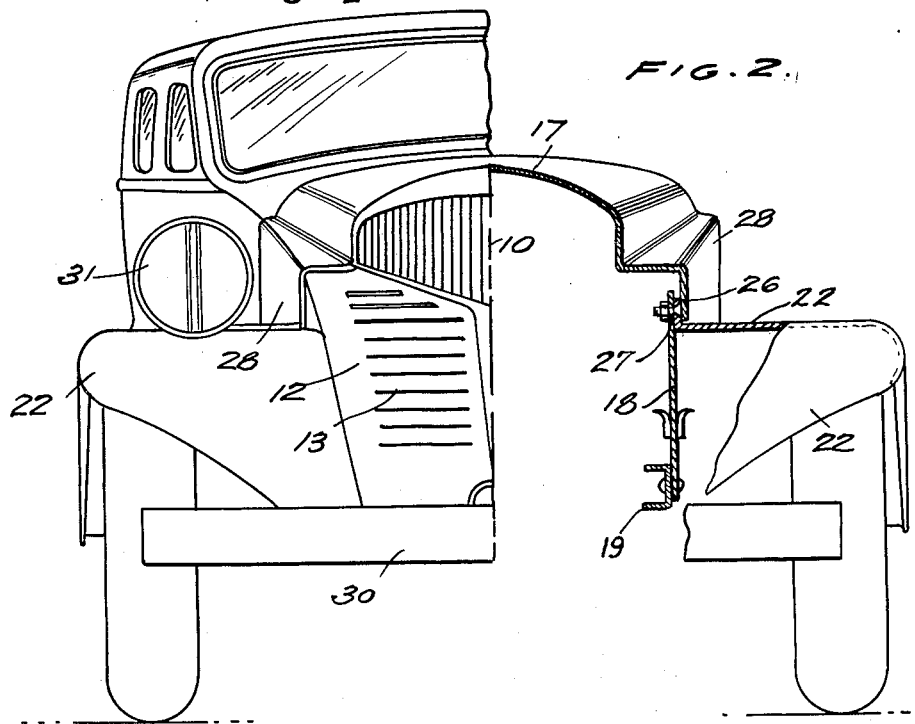
INVENTOR
Arthur M. Graffis
Louis C. Vanderlip.
BY
ATTORNEY Sept. 25, 1934.     A. M. GRAFFIS     1,974,535
MOTOR VEHICLE
Filed Dec. 24, 1931     3 Sheets-Sheet 2
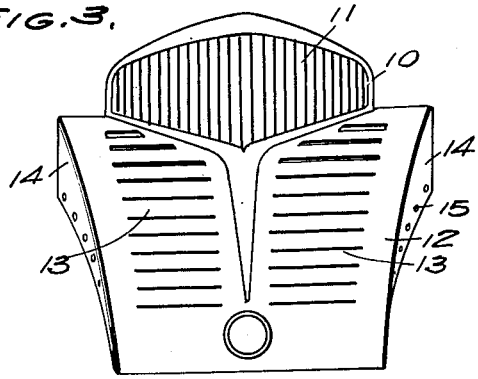
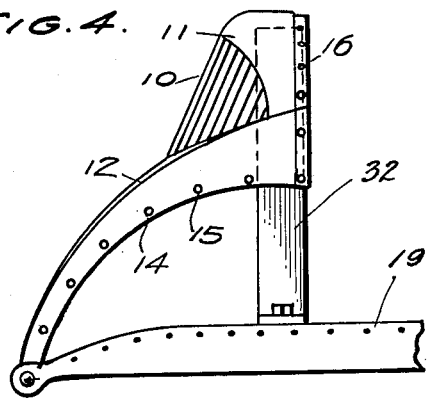
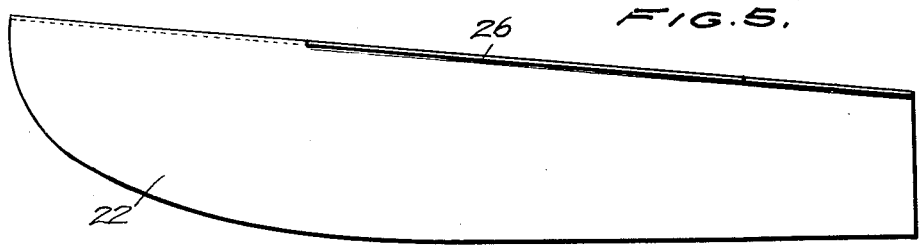
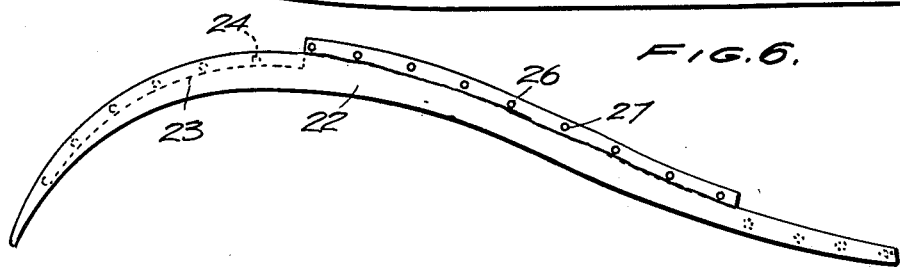
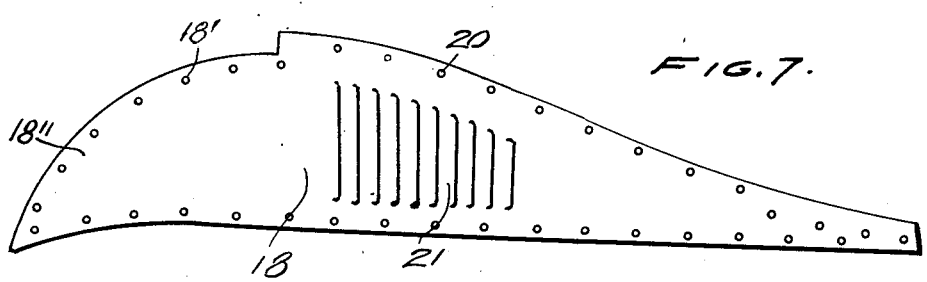
INVENTOR
Arthur M. Graffis
BY Louis C. Vanderlip
ATTORNEY Sept. 25, 1934.   A. M. GRAFFIS   1,974,535
MOTOR VEHICLE
Filed Dec. 24, 1931   3 Sheets-Sheet 3
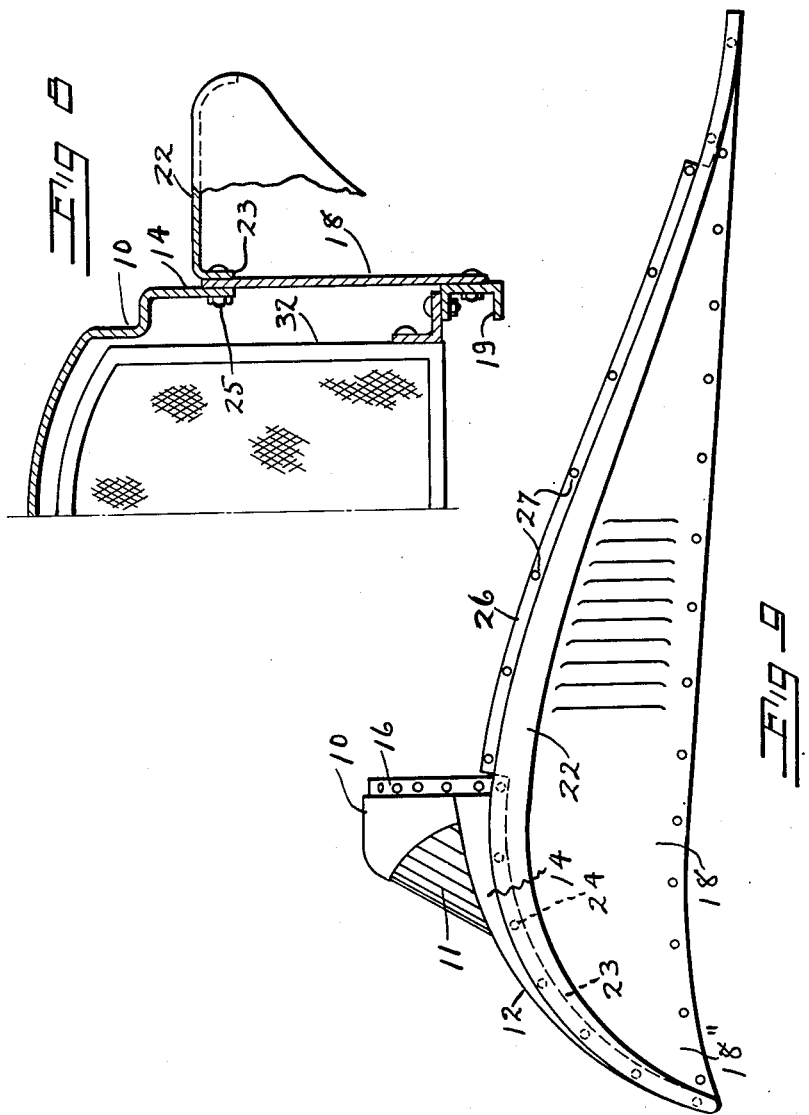

Patented Sept. 25, 1934

1,974,535

UNITED STATES PATENT OFFICE 1,974,535

MOTOR VEHICLE

Arthur M. Graffis, Elkhart, Ind.; Kate Moores Graffis, executrix of said Arthur M. Graffis, deceased, assignor of thirty-five per cent to Louis C. Vanderlip, Elkhart, Ind.

Application December 24, 1931, Serial No. 583,119

19 Claims. (Cl. 280—152)

My invention relates to improvements in motor vehicle body construction, and particularly to a unified radiator shell, fender and hood construction therefor.

In the early days of motor vehicle design and construction some of the vehicle parts were subject to considerable vibration and flapping, this being particularly true of the front fenders which were not only of relatively light weight sheet metal, but also rather ineffectually braced. Due to the design of the motor vehicle front fenders, which were mounted directly upon the side of the chassis frame, and which extended upward and outward therefrom, forming what is known as a "well" between the radiator shell and the fenders, it was difficult, if not impossible, to prevent flapping and vibration of the front fenders until a transverse brace rod, or bar, was introduced, this brace rod, or bar, having its opposite ends rigidly connected with the front ends of the two fenders and extending across the front of the vehicle in front of the radiator proper.

But even this transverse brace rod did not fully overcome fender vibration, for the bar was tied to nothing intermediate its extremities, and there was still some fender vibration in unison. This fender brace rod is still in common use in motor vehicles.

A primary object of the invention is to provide an improved form of construction and assembly of the radiator shell and front fenders so that they will constitute a single unit, rather than be mounted as three separate parts with independent supporting means, as is now the practice.

Another object of the invention is to provide a construction in which the front fenders are secured to a portion of the radiator shell provided for that purpose, and to side plates carried by the frame of the vehicle instead of being bolted, or otherwise secured directly to the main frame, to effect a rigid vibrationless unit composed of the radiator shell, the side plates, and the front fenders.

Another object of the invention is to provide a structure in which the radiator shell and fenders act to mutually interbrace and strengthen each other, especially forwardly of the radiator proper.

A further object is to provide a front fender which requires much less metal than the type now in common use, thereby reducing both the initial cost and the cost of replacements.

A still further object of the invention is to provide such a structure which will give the front end of the vehicle a streamline effect, thereby cutting down wind resistance and contributing to the efficiency as well as to the general appearance of the vehicle as a whole.

It will be understood that the term "radiator shell", as used in the specification and claims, includes the structure extending between the front fenders at the forward terminus of the hood and in advance of the motor, even though a radiator, as commonly understood, may not be enclosed thereby.

Other objects and advantages of the invention, not specifically enumerated above, will become apparent during the course of the following detailed description of the invention, when read in conjunction with the accompanying drawings which form a part of this specification, and in which:

Figure 1 is a side elevation of the front end of an automobile embodying the invention;

Figure 2 is a composite view, partly in front elevation and partly in section on the line 2—2 of Fig. 1;

Figure 3 is a front elevation of the radiator shell;

Figure 4 is a side elevation thereof and including the radiator and a fragment of the chassis frame;

Figure 5 is a plan view of one of the front fenders;

Figure 6 is a side elevation thereof;

Figure 7 is a flat view of one of the side plates employed in the invention;

Figure 8 illustrates a section taken on line 8—8 of Fig. 1; and

Figure 9 illustrates a side view of the assembled relation of the radiator shell, the side panel or plate, and the fender.

Referring now to the drawings in detail 10 indicates a radiator shell having an upstanding central portion 11 and within which the radiator 32 is located, which shell is formed with a forwardly and downwardly curving streamline extension, or apron, 12 provided with horizontally extending grills 13 for the admission of air to the radiator 32 which, as illustrated in Figs. 4 and 8, is carried by the chassis frame.

The forwardly extending integral apron 12 may be wider than the upstanding portion 11 and is formed at either side with depending flanges 14 provided with spaced bolt holes 15. The rearward portion of both the upstanding part 11 and the apron 12 of the radiator shell 10 may be formed with a rearwardly extending stepped ledge 16 which supports the hood or bonnet 17 in the usual manner. The hood 17 is formed of two hinged sections, each of which conforms in contour to the profile of the radiator shell 10 so as to produce a pleasing and continuous line effect.

The radiator shell, as a unit, is forwardly inclined to reduce wind resistance, and a side elevational view thereof presents a decided streamline effect in which flat, upright surfaces of the conventional radiator shell are wholly eliminated. An upstanding side plate 18, provided with the forward extension 18'', is riveted, or otherwise secured to the forward end portion of each of the main chassis frame members 19 and has its upper forward edge portions 18'' conforming in contour to the curve of the apron 12, said forward and upper edge portions 18'' being provided with bolt holes 18' in alinement with the bolt holes 15.

Each of the panel extensions 18'' extends forwardly of and beyond the normal position of the radiator 32 and is secured to and extends to a point adjacent the front end of the chassis frame member 19. The rearwardly extending upper edge portion of the side plates, or sections, 18 are tapered off in conformity with the fender line of the vehicle and terminates at a point adjacent the forward edge of the running board thereof. A series of spaced bolt holes 20 are provided adjacent the tapering edge of the side plates 18, and the body portion of said plates may be provided with vertically extending louvers 21 to carry away the heated air from the engine compartment which is partially enclosed by said plates.

The radiator shell 10, which has its side flanges 14 fastened to the extension 18'' of the side plates 18, as described, is mounted adjacent the forward end of the chassis frame 19 (Fig. 4) and may be considered as actually carried by the chassis frame with which the side plates, or panels, 18 are rigidly connected.

The opposed front fenders 22 are formed with a downwardly and forwardly curving front end portion which is provided with a vertical depending flange 23 conforming in contour to the flange 14 of the apron 12 and the upper edge portion of the forward end 18'' of the side plates 18, said flange being provided with spaced bolt holes 24 adapted to aline with the bolt holes 15 and 18', respectively, and to have securing bolts 25 pass therethrough to securely bind said apron, side plates and fenders together, and thereby forming a rigid unit of the radiator shell 10, the two side plates 18, and the front fenders 22 in front of the radiator proper and across the vehicle front.

Thus, the transverse brace rod which ties the two front fenders together, as heretofore described, is dispensed with, and a much more rigid, as well as a more artistic structure, is produced, and due to the fact that the connection between the radiator shell flanges 14, the side plates 18, and the fenders 22, is carried upward substantially above the chassis frame 19, the rigidity of the unit is thereby enhanced.

The top walls of the fenders 22 are substantially flat in cross section and are formed at their inner edges with upstanding flanges 26 provided with bolt holes 27 in alinement with the bolt holes 20 in the side plates 18, said flanges 26 being secured, as by suitable bolts, to said side plates. The fenders 22 curve downwardly and rearwardly and terminate in the usual manner at the forward edge of the running board of the vehicle.

From the foregoing it will be evident that the side plates 18 function as mounts for the fenders 22 and the radiator shell 10, and all of said members cooperate to produce a very rigid, vibrationless connected unit.

The sides 28 of the hood 17 are formed relatively narrow at their forward edges and have the upper edges thereof conforming in contour to the upper wall of the fenders 22, said sides being progressively wider or higher as they approach the rear edge of the hood. The lower edge of the sides 28 rest against the flange 26 and said sides are held securely in place by suitable latches 29 carried by the fender adjacent each end of the hood.

It will be noted that the forward and lower end of the apron 12, side plates 18, and fenders 22 all terminate in a line with the forward end of the chassis members 19, and that said chassis members are completely enclosed and concealed by these members. When a front bumper 30 is mounted on the forward end of said chassis members an extremely neat and finished appearance is afforded. Due to the fact that the flanges 14 and 23 of the apron 12 and the fenders 22, respectively, are bolted together with the forward edge 18'' of the side plates 18 therebetween, it will be seen that the three major portions of the front of the body are bonded together into a single unit each of which forms a support for the other. Also, since the fender does not have to be provided with a downwardly and inwardly extending and sloping portion, as is now commonly the case, a material saving in metal is accomplished, as well as a stronger fender construction due to the fact that the area of the fender is materially lessened.

And due to the fact that the inner periphery of the fenders 22, adjacent the radiator sides, is spaced substantially above the chassis frame 19 and secured to the respective mounts 18 and to the radiator shell flanges 14 intermediate the top and bottom of the radiator 32, a very rigid fender, radiator shell, and side panel or mount unit is produced. Suitable head lights, such as 31, may be mounted upon each of the fenders 22, and other accessories may be provided; but since they are not pertinent to the invention, they have not been shown in the drawings.

While a preferred embodiment of the invention has been shown and described, it will be distinctly understood that various changes in the details of construction may be resorted to without departing from the spirit of the invention as defined in the appended claims.

Having thus described my invention, what I claim as new and desire to secure by Letters Patent is:

1. In combination, a radiator shell including a forwardly extending portion projecting ahead of the normal position of the radiator proper having vertical side flanges, upstanding panel members spacedly carried on either side of said radiator shell, and fenders on each side of said radiator shell having vertical flanges secured to said flanges of said shell and to said respective upstanding panel members.

2. In combination, a chassis frame, upstanding panel members spacedly carried thereby, a radiator shell mounted between said panels having a forwardly extending portion formed with flanges at either side thereof and projecting ahead of the normal position of the radiator proper, fenders mounted at each side of said shell and secured to the flange portions thereof and to said respective panel members.

3. A vehicle construction including a chassis frame, a radiator shell located adjacent the forward portion of said frame and adapted to enclose a radiator, a forwardly extending apron formed with said shell and having vertical side flanges and projecting ahead of the normal position of the radiator, upstanding side plates carried by said chassis frame having forwardly extending portions conforming to the contour of said apron and rigidly secured to said flanges thereof, and fenders arranged at each side of said radiator shell and secured to said apron flanges and to the forwardly extending portions of the respective side plates.

4. A vehicle construction including a chassis frame, a radiator shell located at the forward end thereof and adapted to enclose a radiator, a forwardly extending apron formed with said shell and having vertical side flanges projecting ahead of the normal position of the radiator, upstanding side plates carried by said chassis frame on each side of said shell and having forwardly extending portions lying adjacent and secured to said vertical flanges, fenders on opposite sides of said shell and plates, said fenders having vertical side flanges formed therewith and lying adjacent said side plates and said flanges of said apron, said flanges, fenders and side plates being secured together.

5. A vehicle construction including a chassis frame, a radiator shell located at the forward end thereof and adapted to enclose an upright radiator, a forwardly extending apron formed with said shell and having vertical side flanges, upstanding side plates carried by said chassis frame on each side of said shell, and projecting ahead of the normal position of the radiator proper and having forwardly extending portions lying adjacent and secured to said vertical flanges, and fenders on opposite sides of said shell and plates, said fenders having vertical flanges formed with the inner edges thereof and secured to said side plates throughout a greater portion of the length thereof.

6. A vehicle construction including a chassis frame, a radiator shell located at the forward end thereof and adapted to enclose a radiator, a forwardly extending apron formed with said shell and having vertical side flanges which project ahead of the normal position of the radiator, upstanding side plates carried by said chassis frame on each side of said shell and having forwardly extending portions lying adjacent and secured to said vertical flanges, fenders on opposite sides of said shell and plates, said fenders having vertical flanges formed therewith and lying adjacent said side plates and said flanges of said apron, said flanges and side plates being secured together.

7. A vehicle construction including a chassis frame, a radiator shell mounted adjacent the forward end thereof, a forwardly extending apron formed with said shell and having vertical side flanges, upstanding side plates carried by said chassis frame on each side of said shell and having forwardly extending portions lying adjacent and secured to said vertical flanges and to said chassis frame, and fenders on opposite sides of said shell and plates, said fenders having vertical flanges formed with the inner edges thereof and secured to said side plates throughout a greater portion of the length thereof.

8. A vehicle construction including a chassis frame, a radiator shell mounted adjacent the forward end thereof and adapted to enclose a radiator, a forwardly extending portion formed with said shell, upstanding side plates carried by said chassis frame at opposite sides of said shell and having forwardly extending portions lying adjacent the forwardly extending portion of said shell, fenders mounted at opposite sides of said shell and plates, the forward portions of said radiator shell, side plates and fenders being rigidly secured together ahead of the normal position of the radiator.

9. In combination, a chassis frame, a radiator shell adapted to enclose a radiator, said shell including a forwardly extending portion provided with side flanges which extend upwardly thereon to a point intermediate the top and bottom of said shell, said shell flanges projecting ahead of the normal position of the radiator, upstanding panel members spacedly carried by said chassis frame on opposite sides of said radiator shell, said panel members projecting ahead of the normal position of the radiator proper, and fenders on each side of said radiator shell having flanges secured to said shell flanges and to said upstanding panel members and providing a rigid unit of said radiator shell, upstanding panel members, and the fenders.

10. In combination, a chassis frame, a radiator shell adapted to enclose a radiator, said shell including a forwardly extending portion provided with side flanges which extend upwardly thereon to a point intermediate the top and bottom of the radiator shell and which project ahead of the normal position of the radiator, upstanding panel members spacedly carried by said chassis frame on opposite sides of said radiator shell, said panel members projecting ahead of the normal position of the radiator proper, and fenders on each side of said radiator shell flanges and provided with flanges which are detachably fastened to said shell flanges and to said upstanding panel members, thereby effecting rigid cooperation between said radiator shell, panel members, and fenders.

11. In combination, a chassis frame, a radiator shell including a forwardly extending portion provided with side flanges, upstanding side panels spacedly carried by said chassis frame, the forward portion of each of said side panels having its upper edge inclined forwardly and downwardly to a point adjacent the front end of said chassis frame, and fenders on each side of said radiator shell and provided with flanges which are secured to said shell flanges and to the inclined front end of said side panels.

12. In combination, a chassis frame, a radiator shell including a forwardly extending portion provided with side flanges, upstanding side panels spacedly carried by said chassis frame, the forward portion of each of said side panels having its upper edge inclined forwardly and downwardly to a point adjacent the front end of said chassis frame, and fenders on each side of said radiator shell and provided with flanges which are detachably secured to said shell flanges and to the upper edge of the front portion of said side panels.

13. In combination, a motor vehicle chassis frame, upstanding panel members spacedly carried thereby, the forward end of each of said panel members being inclined forwardly and downwardly to a point adjacent the front end of said chassis frame, a radiator shell mounted between said panel members and having a forwardly extending portion which is flanged at either side thereof, and a fender mounted at each side of said radiator shell, said fender being secured to a radiator shell flange and to the inclined front end of one of said panel members.

14. In combination, a motor vehicle chassis frame, upstanding panel members spacedly carried thereby, the forward end of each of said panel members being inclined forwardly and downwardly to a point adjacent the front end of said chassis frame, a radiator shell mounted between said panel members and having a forwardly extending portion which is flanged at either side thereof, a flanged fender mounted at each side of said radiator shell, and fastener members securing the flange of each fender to the flanges of the radiator shell forwardly extending portion and to the inclined front end of one of said panel members.

15. In combination with a motor vehicle having a chassis frame, a cowl, and a radiator, the combination of upstanding panel members spacedly carried by the chassis frame, each panel member extending from a point adjacent the cowl to the front end of the chassis frame and beyond the normal position of the radiator, the forward end of each panel member being inclined forwardly and downwardly to a point ahead of the normal position of the radiator proper, a radiator shell mounted between said panel members and having a forwardly extending portion which is flanged at either side thereof, and a fender mounted at each side of said radiator shell and provided with a depending flange adapted to coact with the flange of said radiator shell forwardly extending portion, each fender flange being secured to the flange of said radiator shell forwardly extending portion and to the inclined front end of one of said panel members.

16. In combination, a vehicle chassis frame, a radiator shell unit including a forwardly projecting portion which is provided with flanges at either side thereof, said flanges extending upwardly on said shell projecting portion to a point intermediate the top and bottom of said shell unit, upstanding panel members spacedly carried by the chassis frame, and a fender arranged at each side of the radiator shell unit, each fender being provided with a forwardly and downwardly extending flange which is secured to the flange of the radiator shell forwardly projecting portion and to one of said panel members, thereby effecting rigid cooperation between the radiator shell, the upstanding panel members, and the fenders.

17. In combination, a chassis frame, upstanding panel members spacedly carried thereby, a radiator shell mounted between said panel members and provided with a forwardly and downwardly projecting portion having depending flanges at either side thereof, said flanges extending forwardly and downwardly in conformation with said shell projecting portion, and fenders arranged at either side of said radiator shell and secured to the flanges of the radiator shell projecting portion and to said respective panel members.

18. In combination, a vehicle chassis frame, upstanding panel members spacedly carried thereby, a radiator carried by said chassis frame, a radiator shell arranged about said radiator and provided with a forwardly extending portion, fenders arranged on each side of said radiator and radiator shell, the inner periphery of each fender, adjacent the sides of the radiator, being spaced substantially above said chassis frame and secured to said respective panels and to said radiator shell intermediate the top and bottom of said radiator, and said fenders being secured also to the forwardly extending portion of said radiator shell.

19. In combination, a vehicle chassis frame, upstanding panel members spacedly carried thereby, a radiator carried by said chassis frame, a radiator shell arranged about said radiator and provided with a forwardly extending portion, fenders arranged on either side of said radiator and radiator shell, the inner periphery of each fender, adjacent the sides of the radiator, being spaced substantially above said chassis frame and secured to said respective panels and to said radiator shell intermediate the top and bottom of said radiator, and said fenders and panel members being secured also to the forwardly extending portion of said radiator shell.

ARTHUR M. GRAFFIS.